United States Patent
Li et al.

(10) Patent No.: US 9,524,158 B2
(45) Date of Patent: Dec. 20, 2016

(54) MANAGING FIRMWARE UPDATES FOR INTEGRATED COMPONENTS WITHIN MOBILE DEVICES

(71) Applicant: Apple Inc., Cupertino, CA (US)

(72) Inventors: Li Li, Los Altos, CA (US); Jerrold Von Hauck, Windermere, FL (US); Najeeb M. Abdulrahiman, Fremont, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 14/629,388

(22) Filed: Feb. 23, 2015

(65) Prior Publication Data

US 2016/0246585 A1     Aug. 25, 2016

(51) Int. Cl.
| | |
|---|---|
| *G06F 9/44* | (2006.01) |
| *G06F 9/445* | (2006.01) |
| *H04W 8/24* | (2009.01) |
| *H04L 29/06* | (2006.01) |

(52) U.S. Cl.
CPC . *G06F 8/65* (2013.01); *G06F 8/61* (2013.01); *H04L 63/0853* (2013.01); *H04W 8/24* (2013.01)

(58) Field of Classification Search
CPC ............ H04L 63/0428; H04L 63/0853; H04W 52/0235; H04W 88/02; H04W 88/06; H04W 12/10; G06F 21/33; G06F 8/61; G06F 8/65; G06F 8/665
See application file for complete search history.

(56) References Cited

U.S. PATENT DOCUMENTS

| | | | |
|---|---|---|---|
| 2004/0117623 A1* | 6/2004 | Kalogridis | H04L 63/0807 713/165 |
| 2008/0125084 A1* | 5/2008 | Cambois | H04W 88/02 455/411 |
| 2008/0235513 A1* | 9/2008 | Foster | G06F 21/33 713/185 |
| 2009/0313472 A1* | 12/2009 | Guccione | H04L 63/0428 713/171 |
| 2011/0010543 A1* | 1/2011 | Schmidt | H04W 12/10 713/168 |
| 2012/0108207 A1* | 5/2012 | Schell | H04L 63/0853 455/411 |
| 2015/0072726 A1* | 3/2015 | Stern | H04W 88/06 455/552.1 |
| 2015/0143125 A1* | 5/2015 | Nix | H04W 52/0235 713/171 |
| 2015/0220319 A1* | 8/2015 | Weiss | G06F 8/665 713/168 |

* cited by examiner

*Primary Examiner* — Tuan Vu

(74) *Attorney, Agent, or Firm* — Downey Brand LLP

(57) ABSTRACT

Disclosed herein is a technique for updating firmware of an embedded Universal Integrated Circuit Card (eUICC) included in a mobile device. The technique includes the steps of (1) receiving, from a firmware provider, an indication that an updated firmware is available for the eUICC, (2) in response to the indication, providing, to the firmware provider, (i) a unique identifier (ID) associated with the eUICC, and (ii) a nonce value, (3) subsequent to providing, receiving, from the firmware provider, a firmware update package, wherein the firmware update package includes (i) authentication information, and (ii) the updated firmware, (4) subsequent to verifying the authentication information, persisting, to a memory included in the mobile device, a hash value that corresponds to the updated firmware, and (5) installing the updated firmware on the eUICC.

20 Claims, 7 Drawing Sheets

MANAGING FIRMWARE UPDATES FOR INTEGRATED COMPONENTS WITHIN MOBILE DEVICES

FIELD

The described embodiments set forth a technique for managing firmware updates for integrated components—such as embedded Universal Integrated Circuit Cards (eUICCs) configured to manage electronic Subscriber Identity Modules (eSIMs)—within mobile devices.

BACKGROUND

Most mobile devices are configured to receive removable Universal Integrated Circuit Cards (UICCs) that enable the mobile devices to access services provided by mobile network operators (MNOs). In particular, each UICC includes at least a microprocessor and a read-only memory (ROM), where the ROM is configured to store an MNO profile that the mobile device can utilize to register and interact with an MNO. Typically, a UICC takes the form of a small removable card (commonly referred to as a SIM card) that is configured to be inserted into a UICC-receiving bay included in a mobile device. In more recent implementations, however, UICCs are being embedded directly into system boards of mobile devices. Notably, these embedded UICCs (eUICCs) can provide several advantages over traditional, removable UICCs. For example, some eUICCs include a rewritable memory that can facilitate eSIM updates for accessing extended features provided by MNOs. eUICCs can also eliminate the need for UICC-receiving bays within mobile devices. The adoption of eUICCs, therefore, not only increases the flexibility of mobile devices, but also simplifies their design and frees up space for other components.

In some cases, it can be desirable to update an eUICC's firmware so that the eUICC can provide new or enhanced services to a user of the mobile device that includes the eUICC. However, firmware updates can be quite risky, as hardware components can become permanently inoperable when firmware updates are not carried out properly. This drawback is especially significant with respect to eUICCs as they are embedded within mobile devices and cannot be easily replaced if a firmware corruption were to occur.

SUMMARY

Representative embodiments set forth herein disclose various techniques for managing firmware of an eUICC included in a mobile device. Specifically, the eUICC is configured to manage a primary firmware and a backup firmware, and to implement a firmware loader that promotes up-to-date and operable firmware remaining intact within the eUICC. When the primary firmware is operable and activated within the eUICC, the firmware loader can obtain and carry out a primary firmware update. When the primary firmware is inoperable—e.g., when the primary firmware becomes corrupted during regular operation, or when an update of the primary firmware is not properly carried out—the firmware loader can obtain the backup firmware and replace the primary firmware with the backup firmware. In turn, the backup firmware can be used to return operability to the eUICC, whereupon the firmware loader can attempt to restore an operable primary firmware within the eUICC. In some cases, it can be desirable to update the backup firmware, so the firmware loader is also configured to receive and install updated backup firmware within the eUICC. It is noted that the foregoing firmware management techniques can be implemented without affecting other data (e.g., eSIMs) managed by the eUICC, which further contributes to promoting robust operability of the eUICC.

One embodiment sets forth a method for updating firmware of an embedded Universal Integrated Circuit Card (eUICC) included in a mobile device. Specifically, the method is implemented by the eUICC, and includes the steps of (1) receiving, from a firmware provider, an indication that an updated firmware is available for the eUICC, (2) in response to the indication, providing, to the firmware provider, (i) a unique identifier (ID) associated with the eUICC, and (ii) a nonce value, (3) subsequent to providing, receiving, from the firmware provider, a firmware update package, where the firmware update package includes (i) authentication information, and (ii) the updated firmware, (4) subsequent to verifying the authentication information, persisting, to a memory included in the mobile device, a hash value that corresponds to the updated firmware, and (5) installing the updated firmware on the eUICC.

Another embodiment sets forth an embedded Universal Integrated Circuit Card (eUICC) configured to perform a firmware recovery procedure. Specifically, the eUICC includes a non-volatile memory, and a processor that is configured to carry out steps that include: (1) detecting a failure of a primary firmware of the eUICC, (2) obtaining, from the non-volatile memory, a backup firmware for the eUICC, and (3) replacing the primary firmware with the backup firmware, where the backup firmware enables a subsequent installation of a different primary firmware.

Yet another embodiment sets forth a mobile device that includes an eUICC that is configured to carry out a firmware update. Specifically, the eUICC is configured to carry out steps that include: (1) receiving, from a firmware provider, an indication that an updated backup firmware is available for the eUICC, (2) in response to the indication, providing, to the firmware provider, (i) a unique identifier (ID) associated with the eUICC, and (ii) a nonce value, (3) receiving, from the firmware provider, a firmware update package, where the firmware update package includes (i) authentication information, and (ii) the updated backup firmware, and (4) subsequent to verifying the authentication information: persisting, to a memory included in the mobile device, (i) the updated backup firmware, and (ii) a hash value based on the updated backup firmware.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
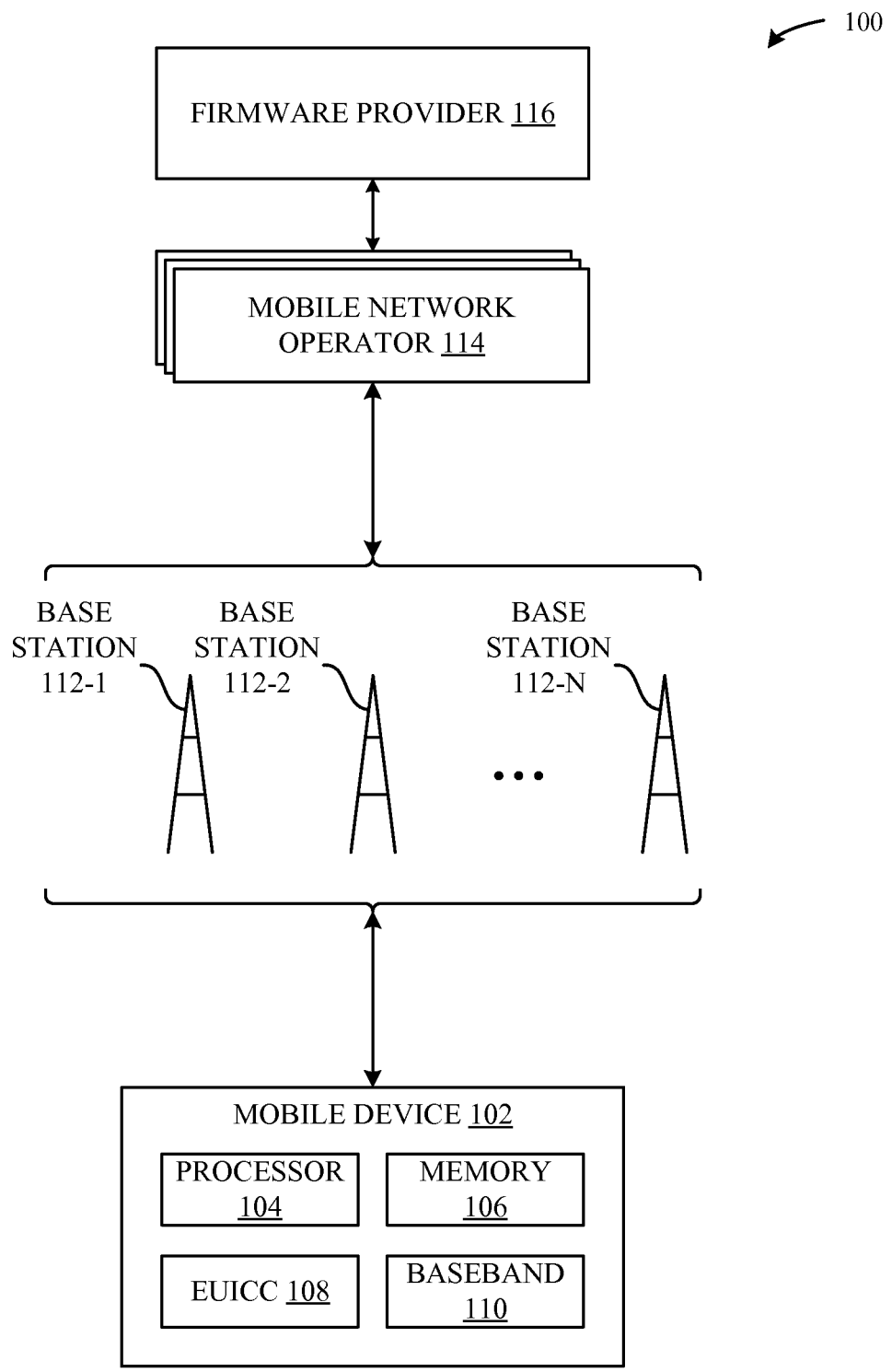
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments set forth herein provide various techniques for managing firmware of an eUICC included in a mobile device. According to one embodiment, the eUICC is configured to implement a firmware loader that promotes up-to-date and operable firmware remaining intact within the eUICC. To achieve the foregoing, the firmware loader is configured to manage a primary firmware and a backup firmware. The primary firmware represents the firmware utilized by the eUICC when the eUICC is operating in a normal mode and providing various functionalities to the mobile device in which the eUICC is included. Conversely, the backup firmware represents the firmware utilized by the eUICC when the primary firmware becomes inoperable (e.g., when a corruption of the primary firmware occurs), where the backup firmware restores the eUICC to operability and enables the eUICC to reattempt an installation of a primary firmware. According to some embodiments, the firmware loader can be configured to receive both primary and backup firmware updates and to carry out the firmware updates within the eUICC. This can involve, for example, interfacing with an external entity—such as a manufacturer or managing entity of the eUICC/mobile device—and securely downloading firmware updates that are specific to the eUICC/mobile device.

When the primary firmware is operable and activated within the eUICC, the firmware loader can obtain and carry out a primary firmware update. When the primary firmware is inoperable—e.g., when the primary firmware becomes corrupted during regular operation, or when an update of the primary firmware is not properly carried out—the firmware loader can obtain the backup firmware and replace the primary firmware with the backup firmware. In turn, the backup firmware can be used to return operability to the eUICC, whereupon the firmware loader can attempt to restore an operable primary firmware within the eUICC. In some cases, it can be desirable to update the backup firmware, so the firmware loader is also configured to receive and install updated backup firmware within the eUICC. The foregoing techniques are described below in greater detail in conjunction with FIGS. 1-7.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, a group of base stations 112 that are managed by different MNOs 114, and a firmware provider 116. According the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed. Moreover, and as described in greater detail below, the firmware provider 116 can represent one or more servers that are configured to communicate with the mobile device 102 and to provide firmware updates to the mobile device 102 in a secure manner.

As shown in FIG. 1, the mobile device 102 can include a processor 104, a memory 106, an eUICC 108, and a baseband module 110. These components work in conjunction to enable the mobile device 102 to provide useful features to a user of the mobile device 102, such as localized computing, location based services, and Internet connectivity. As described in greater detail below, the eUICC 108 can be configured to store multiple eSIMs for accessing the different MNOs 114 through the base stations 112. For example, the eUICC 108 can be configured to store an eSIM 208 for each MNO 114 to which mobile device 102 is subscribed. As also described in greater detail below, the mobile device 102—specifically, the eUICC 108 included in the mobile device 102—can be configured to receive and process firmware updates from the firmware provider 116 in accordance with the various techniques set forth herein.

Figure 2:
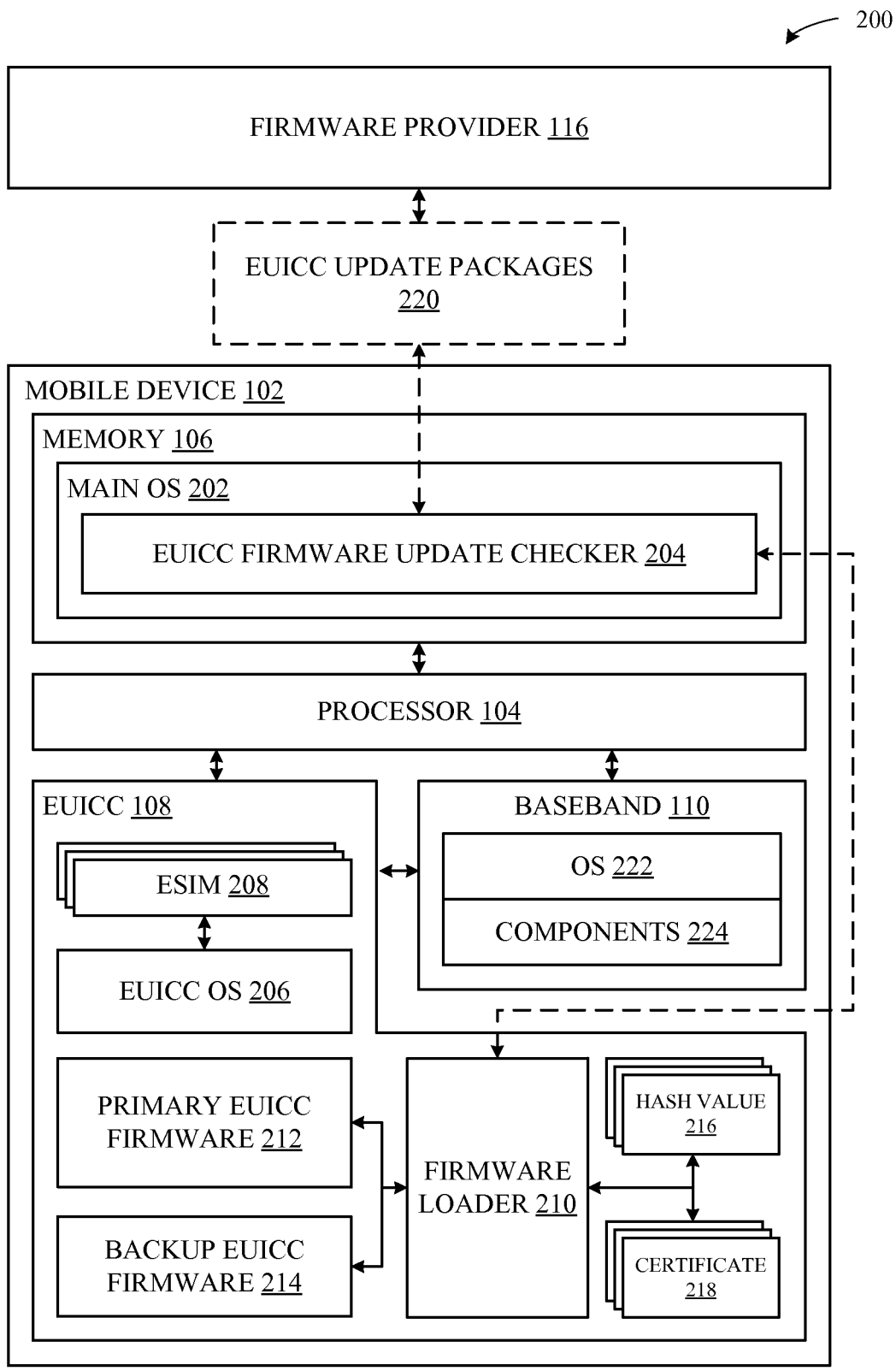
FIG. 2 illustrates a block diagram of a more detailed view of particular components of the system of FIG. 1, according to some embodiments.

FIG. 2 illustrates a block diagram of a more detailed view 200 of particular components of the mobile device 102 of FIG. 1, according to some embodiments. As shown in FIG. 2, the processor 104, in conjunction with the memory 106, can implement a main operating system (OS) 202 that is configured to execute applications (e.g., native OS applications and user applications). According to one embodiment, the main OS 202 can be configured to execute an eUICC firmware update checker 204 that is configured to facilitate firmware updates between the firmware provider 116 and the eUICC 108. Specifically, the eUICC firmware update checker 204 can be configured to periodically query the firmware provider 116 to identify when firmware updates for the eUICC 108 are available. This can involve, for example, the eUICC firmware update checker 204 providing version information of the firmware currently being used by the eUICC 108 so that the firmware provider 116 can effectively determine whether a firmware update is available for the eUICC 108. In some embodiments, the eUICC firmware update checker 204 can be configured to receive push notifications from the firmware provider 116 to enhance the efficiency by which firmware update information is communicated between the eUICC firmware update checker 204 and the firmware provider 116.

As shown in FIG. 2, the eUICC 108 can be configured to implement an eUICC OS 206 that is configured to manage the hardware resources of the eUICC 108 (e.g., a processor, a random access memory (RAM), and a non-volatile memory, not illustrated in FIG. 2). The eUICC OS 206 can also be configured to manage eSIMs 208 that are stored by the eUICC 108, e.g., by activating the eSIMs 208 within the eUICC 108 and providing the baseband module 110 with access to the eSIMs 208. According to the illustration shown in FIG. 2, each eSIM 208 can be associated with a unique identifier and can include multiple applets that define the manner in which the eSIM 208 operates. For example, one or more of the applets, when implemented by the baseband module 110 and the eUICC 108, can be configured to enable the mobile device 102 to communicate with an MNO 114 to activate features (e.g., phone calls and internet) of the mobile device 102.

As shown in FIG. 2, the eUICC 108 can implement a firmware loader 210 that is configured to carry out the various firmware update techniques set forth herein. Specifically, the firmware loader 210 can be configured to interface with the eUICC firmware update checker 204 and provide/receive information to carry out secure transmission and processing of firmware updates for the eUICC (illustrated as eUICC updated packages 220 in FIG. 2). For example, and as described in greater detail below, the firmware loader 210 can be configured to be notified by the eUICC firmware update checker 204 when firmware updates become available for the eUICC 108. It is noted that, in some embodiments, the functionality provided by the eUICC firmware update checker 204 can instead be provided by the firmware loader 210, such that the firmware loader 210 is configured to interface directly with the firmware provider 116.

As described below in greater detail, the firmware loader 210, upon receipt of an indication that a firmware update is available, can be configured to provide (i) a unique identifier associated with the eUICC 108, and (ii) a nonce value, which can be used by the firmware provider 116 when generating a firmware update that is specific to the eUICC 108. In turn, the firmware provider 116 delivers the firmware update to the firmware loader 210, whereupon the firmware loader 210 can analyze components of the firmware update (e.g., digital signatures) to ensure that the firmware provider 116—and the firmware update itself—are authentic and can be trusted by the eUICC 108. As described below in greater detail, the firmware loader 210 can also be configured to manage hash values 216 and certificates 218 that further enable the firmware loader 210 to securely conduct the firmware update procedure.

Additionally, and as shown in FIG. 2, the baseband module 110 of the mobile device 102 can include a baseband OS 222 that is configured to manage the different hardware resources—illustrated in FIG. 2 as components 224 (e.g., a processor, a memory, different radio transmitters/receivers, etc.)—of the baseband module 110. According to one embodiment, the baseband OS 222 can be configured to implement various services that can be instantiated in accordance with one or more of the eSIMs 208 that are managed by the eUICC 108. For example, the baseband OS 222 can be configured to manage different connections that exist between the mobile device 102 and the MNOs 114 according to the different eSIMs 208 that are activated throughout the utilization of the mobile device 102.

Figure 3:
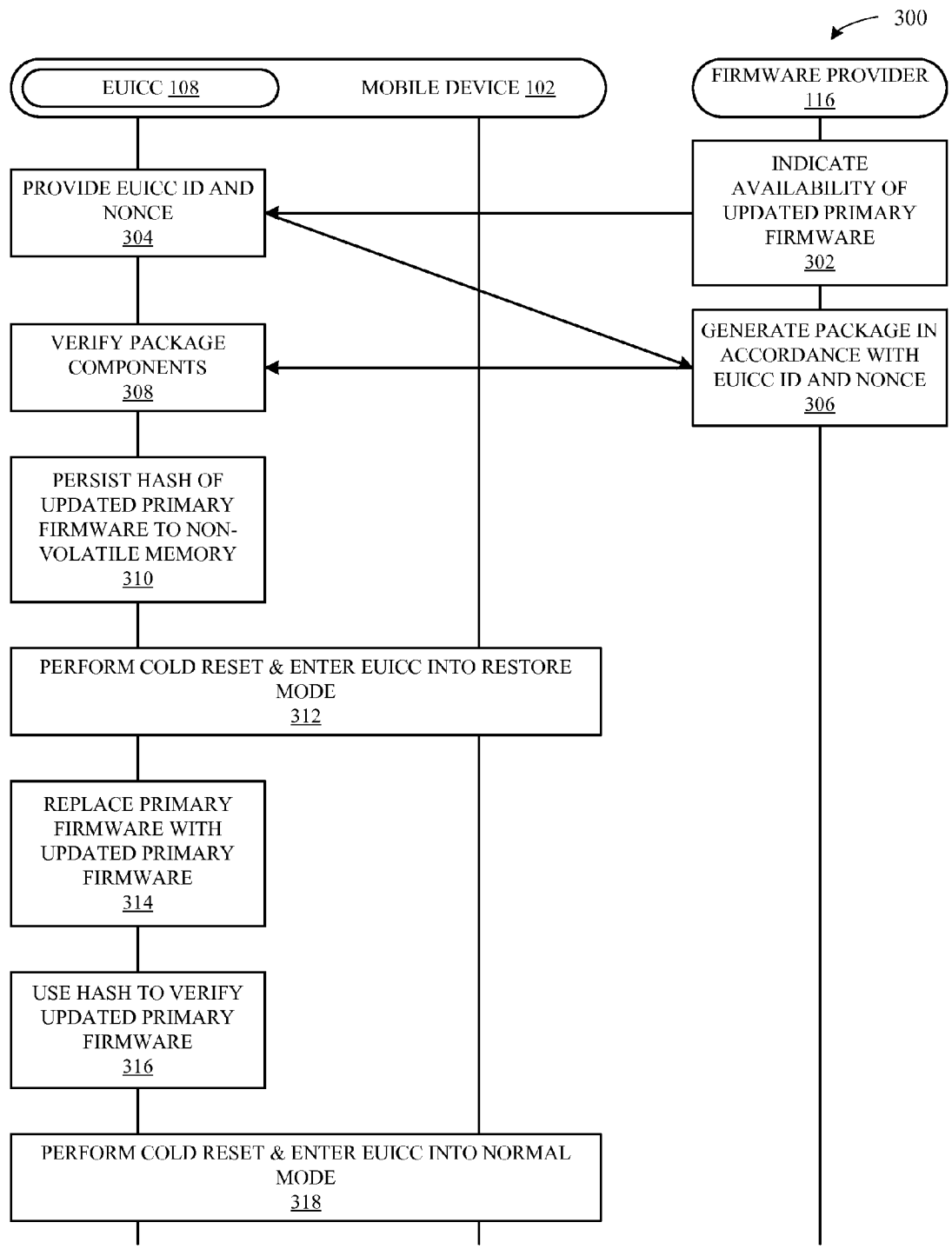
FIG. 3 illustrates a sequence diagram of a method for updating a primary firmware of an eUICC included in a mobile device, according to one embodiment.

FIG. 3 illustrates a sequence diagram of a method 300 for updating the primary eUICC firmware 212 illustrated in FIG. 2, according to one embodiment. Prior to step 302, the eUICC 108 is operating in a normal mode, i.e., the eUICC 108 is operating the primary eUICC firmware 212 and providing typical functionality to the mobile device 102. As shown, the method 300 begins at step 302, where the firmware provider 116 indicates an availability of an updated primary firmware that can replace the primary eUICC firmware 212. According to one embodiment, the firmware provider 116 provides this indication to the mobile device 102—specifically, to the eUICC firmware update checker 204—whereupon the eUICC firmware update checker 204 provides the indication to the eUICC 108 (e.g., through one or more commands). In an alternative embodiment, the eUICC firmware update checker 204 can be omitted, and the firmware provider 116 can communicate directly with the firmware loader 210.

In turn, at step 304, the eUICC 108—specifically, the firmware loader 210 executing within the eUICC 108—provides to the eUICC firmware update checker 204 (i) a unique identifier of the eUICC 108 ("EUICC ID" in FIG. 3), and (ii) a nonce value ("NONCE" in FIG. 3). The unique identifier can take any form that can be used to uniquely identify the eUICC 108 (e.g., an alphanumeric serial number) and enables the firmware provider 116 to at least partially identify that the mobile device 102 is authentic. For example, the firmware provider 116 can check the unique identifier against a database of known eUICC identifiers to determine whether or not the unique identifier is recognized. The nonce value can take any form that can be used to communicate a one-use value (e.g., a large integer) for securing a transmission of the updated primary firmware from the firmware provider 116 to the firmware loader 210. Specifically, the nonce value can be used to help protect against replay attacks that could potentially be used by malicious parties to deliver corrupted updated primary firmware to the eUICC 108 without detection. To achieve the foregoing benefits, and, as described below in greater detail, the firmware provider 116 can accompany the updated primary firmware with digital signatures that can be authenticated by the firmware loader 210, where the digital signatures are based on one or more of the unique identifier and the nonce. The digital signatures can be provided by different entities that are associated with the mobile device 102, such as a manufacturer or manager of the mobile device 102, a manufacturer or manager of the eUICC 108, and the like. In this manner, the firmware loader 210 can verify, based on the digital signatures, that the updated primary firmware delivered by the firmware provider 116 is authentic and specific to the eUICC 108.

At step 306, the firmware provider 116 generates a primary firmware update package in accordance with the unique identifier and the nonce value. According to one embodiment, and as set forth above, the primary firmware update package can include various components that promote a secure transmission of the updated primary firmware. For example, the primary firmware update package can include digital credentials of an owner of the updated primary firmware (e.g., a manufacturer or managing entity of the eUICC 108, a provider of the eUICC OS 206, etc.), digital credentials of a deliverer (e.g., the firmware provider 116, a manufacturer of the mobile device 102, etc.) of the primary firmware update package, the updated primary firmware itself, and the like. As previously described herein, the firmware loader 210 can manage various certificates 218 that establish various entities that are trusted by the eUICC 108, and the authenticity of the digital signatures included within the primary firmware update package can verified by checking the digital signatures against one or more of the certificates 218. According to some embodiments, the primary firmware update package can be transmitted in encrypted form between the firmware provider 116 and the firmware loader 210 by way of the one or more certificates 218.

At step 308, the firmware loader 210 receives the primary firmware update package and verifies the aforementioned components that are included in the primary firmware update package. Assuming there are no discrepancies, the method 300 proceeds to step 310, where the firmware loader 210 persists a hash value 216 of the updated primary firmware to the a non-volatile memory that is accessible to the firmware loader 210. In some embodiments, a Media Access Control (MAC) address associated with the eUICC 108 (or other components included in the mobile device 102) can replace or accompany the hash value 216. As described below in greater detail, persisting the hash value 216 to the non-volatile memory enables the eUICC 108 to undergo a cold reset that would otherwise cause the hash value 216 to be erased if it were stored in a volatile memory (e.g., a RAM of the eUICC 108). As also described below in greater detail, this persisted hash value 216 is used by the firmware loader 210 to verify that the updated primary firmware that is ultimately installed is, in fact, the same updated primary firmware included in the primary firmware update package verified by the firmware loader 210 at step 308.

At step 312, the eUICC 108 undergoes a cold reset and enters into a restore mode that enables the firmware loader 210 to perform the primary firmware update. At step 314, the firmware loader 210 replaces the primary eUICC firmware 212 with the updated primary firmware included in the primary firmware update package, thereby rendering a new primary eUICC firmware 212 within the eUICC 108. Next, at step 316, the firmware loader 210 accesses the hash value 216 persisted to the non-volatile memory at step 310 to determine whether or not the new primary eUICC firmware 212 corresponds to the hash value 216.

In the event that the new primary eUICC firmware 212 does not correspond to the hash value 216, the eUICC 108 remains in the restore mode and the firmware loader 210 carries out a recovery technique using the backup eUICC firmware 214, which is described below in greater detail in conjunction with FIG. 4. Conversely, in the event that the new primary eUICC firmware 212 does correspond to the hash value 216, the eUICC 108 undergoes a cold reset and enters back into a normal mode that enables the eUICC 108 to operate the new primary eUICC firmware 212 and provide typical functionality to the mobile device 102.

Accordingly, FIG. 3 sets forth a technique for updating the primary eUICC firmware 212 in a secure manner. In some cases, and as previously alluded to herein, situations can occur where the primary eUICC firmware 212 can become corrupted and render the eUICC 108 inoperable. To cure this deficiency, the embodiments set forth herein include a technique that enables the firmware loader 210 to recover from the corruption event by loading the backup eUICC firmware 214. Specifically, the backup eUICC firmware 214 provides an avenue to recover the eUICC 108 and restore an operable primary eUICC firmware 212, which is described below in greater detail in conjunction with FIG. 4.

Figure 4:
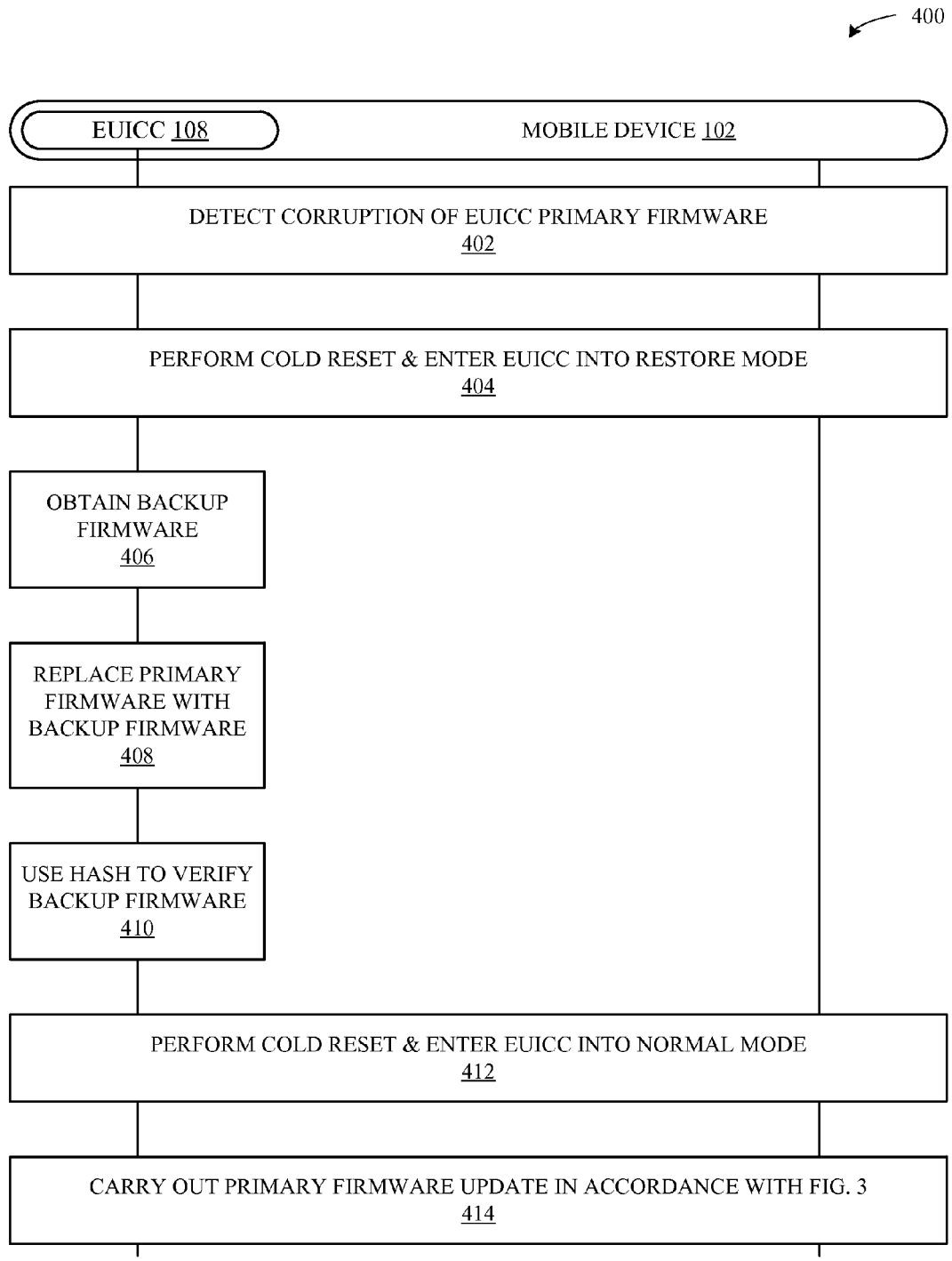
FIG. 4 illustrates a sequence diagram of a method for using a backup firmware of the eUICC to carry out a recovery technique when the primary firmware of the eUICC becomes corrupted, according to one embodiment

FIG. 4 illustrates a sequence diagram of a method 400 for recovering from a primary eUICC firmware 212 corruption event, according to one embodiment. As shown in FIG. 4, the method 400 begins at step 402, where a corruption of the primary eUICC firmware 212 is detected. In response, at step 404, the eUICC 108 is cold-restarted and enters into the restore mode described above in conjunction with FIG. 3. At step 406, the eUICC 108—specifically, the firmware loader 210—obtains the backup eUICC firmware 214 from the non-volatile memory that is accessible to the firmware loader 210. According to one embodiment, the backup eUICC firmware 214 is stored in a protected/supplemental area of the non-volatile memory, and a location of the backup eUICC firmware 214 is known to the firmware loader 210. Moreover, a hash value 216 that corresponds to the backup eUICC firmware 214 is also stored in the non-volatile memory, and a location of the hash value 216 is known to the firmware loader 210. As described below in greater detail, this enables the firmware loader 210 to verify a recovered primary eUICC firmware 212 after the corrupted primary eUICC firmware 212 is replaced with the backup eUICC firmware 214.

At step 408, the firmware loader 210 replaces the primary eUICC firmware 212 with the backup eUICC firmware 214 to produce a recovery primary eUICC firmware 212. At step 410, the firmware loader 210 verifies the recovery primary eUICC firmware 212 using the hash value 216 persisted to the non-volatile memory. Next, assuming the verification succeeds, the eUICC 108 undergoes a cold reset and enters into the normal mode described above in conjunction with FIG. 3. Subsequently, at step 414, the firmware loader 210 can undergo the technique set forth in FIG. 3 to attempt to retrieve and install a primary eUICC firmware 212 that is not corrupted.

Accordingly, FIG. 4 sets forth a technique that enables the firmware loader 210 to recover in the event that the primary eUICC firmware 212 becomes corrupted. In some cases, it can be desirable to enable the backup eUICC firmware 214 to be updated with a different version of the backup eUICC firmware 214. Accordingly, the firmware loader 210 can further be configured to implement a technique for updating the backup eUICC firmware 214, which is described below in greater detail in conjunction with FIG. 5.

Figure 5:
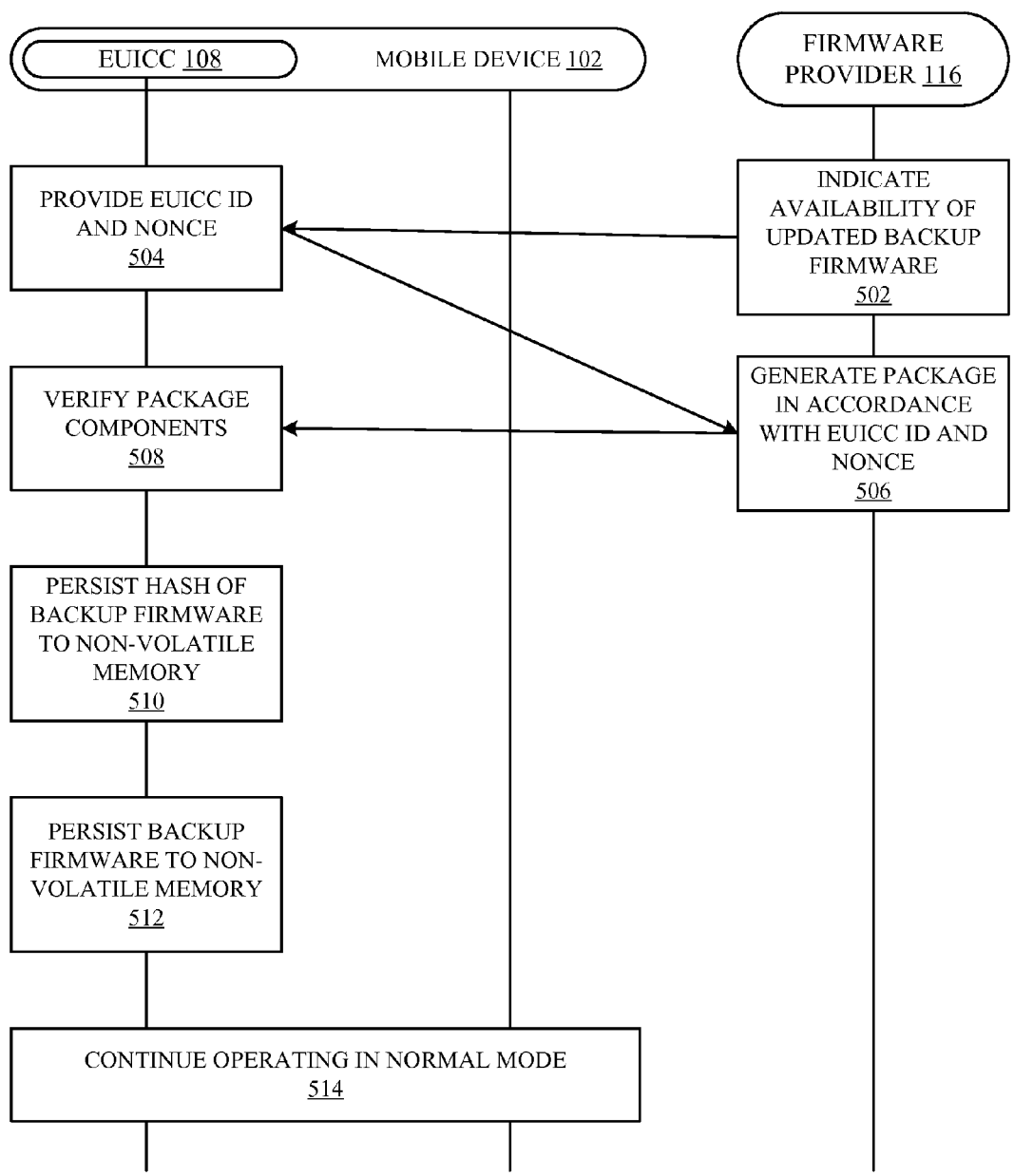
FIG. 5 illustrates a sequence diagram of a method for updating the backup firmware of the eUICC, according to one embodiment.

FIG. 5 illustrates a sequence diagram of a method 500 for updating the backup eUICC firmware 214 illustrated in FIG. 2, according to one embodiment. Prior to step 502, the eUICC 108 is operating in a normal mode, i.e., the eUICC 108 is operating the primary eUICC firmware 212 and providing typical functionality to the mobile device 102. Notably, updating the backup eUICC firmware 214 does not require the eUICC 108 to enter into the restore mode, as the backup eUICC firmware 214 is not actually being installed for active use within the eUICC 108. Instead, the existing backup eUICC firmware 214 stored in the non-volatile memory is replaced with an updated backup eUICC firmware 214 provided by the firmware provider 116, and the existing hash value 216 that corresponds to the existing backup eUICC firmware 214 is replaced with an updated hash value 216 that corresponds to the updated backup eUICC firmware 214. In this manner, and according to the techniques previously described herein in conjunction with FIG. 4, the firmware loader 210 can properly install and verify the updated backup eUICC firmware 214 in the event that the primary eUICC firmware 212 becomes corrupted.

As shown, the method 500 begins at step 502, where the firmware provider 116 indicates an availability of an updated backup firmware that can replace the backup eUICC firmware 214. As previously set forth herein, the firmware provider 116 can be configured to provide this indication to the mobile device 102—specifically, to the eUICC firmware update checker 204—whereupon the eUICC firmware update checker 204 provides the indication to the eUICC 108 (e.g., through one or more commands). In an alternative embodiment, the eUICC firmware update checker 204 can be omitted, and the firmware provider 116 can communicate directly with the firmware loader 210.

In turn, at step 504, the eUICC 108—specifically, the firmware loader 210 executing within the eUICC 108—provides to the eUICC firmware update checker 204 (i) a unique identifier of the eUICC 108 ("EUICC ID" in FIG. 5), and (ii) a nonce value ("NONCE" in FIG. 5). At step 506, the firmware provider 116 generates a backup firmware update package in accordance with the unique identifier and the nonce value. According to one embodiment, and as set forth above, the backup firmware update package can include the same components as the primary firmware update package described above in conjunction with FIG. 3—e.g., digital credentials of an owner of the updated backup firmware, digital credentials of a deliverer of the backup firmware update package, the updated backup firmware itself, and the like—to promote a secure transmission of the updated backup firmware.

At step 508, the firmware loader 210 receives the backup firmware update package and verifies the aforementioned components that are included in the backup firmware update package. Assuming there are no discrepancies, the method 500 proceeds to step 510, where the firmware loader 210 persists a hash value 216 of the updated backup firmware to the non-volatile memory that is accessible to the firmware loader 210. At step 512, the firmware loader 210 persists the backup firmware itself to the non-volatile memory. A location of the persisted hash value 216—as well as the persisted backup firmware—is noted by the firmware loader 210 so that the firmware loader 210 can appropriately carry out the recovery method described above in conjunction with FIG. 4 in the event that a corruption of the primary eUICC firmware 212 occurs.

Finally, at step 514, the eUICC 108 continues operating in the normal mode, which involves the eUICC 108 operating the primary eUICC firmware 212 and providing typical functionality to the mobile device 102. Accordingly, FIG. 5 sets forth a technique for updating the backup eUICC firmware 214 in a secure manner.

Figure 6:
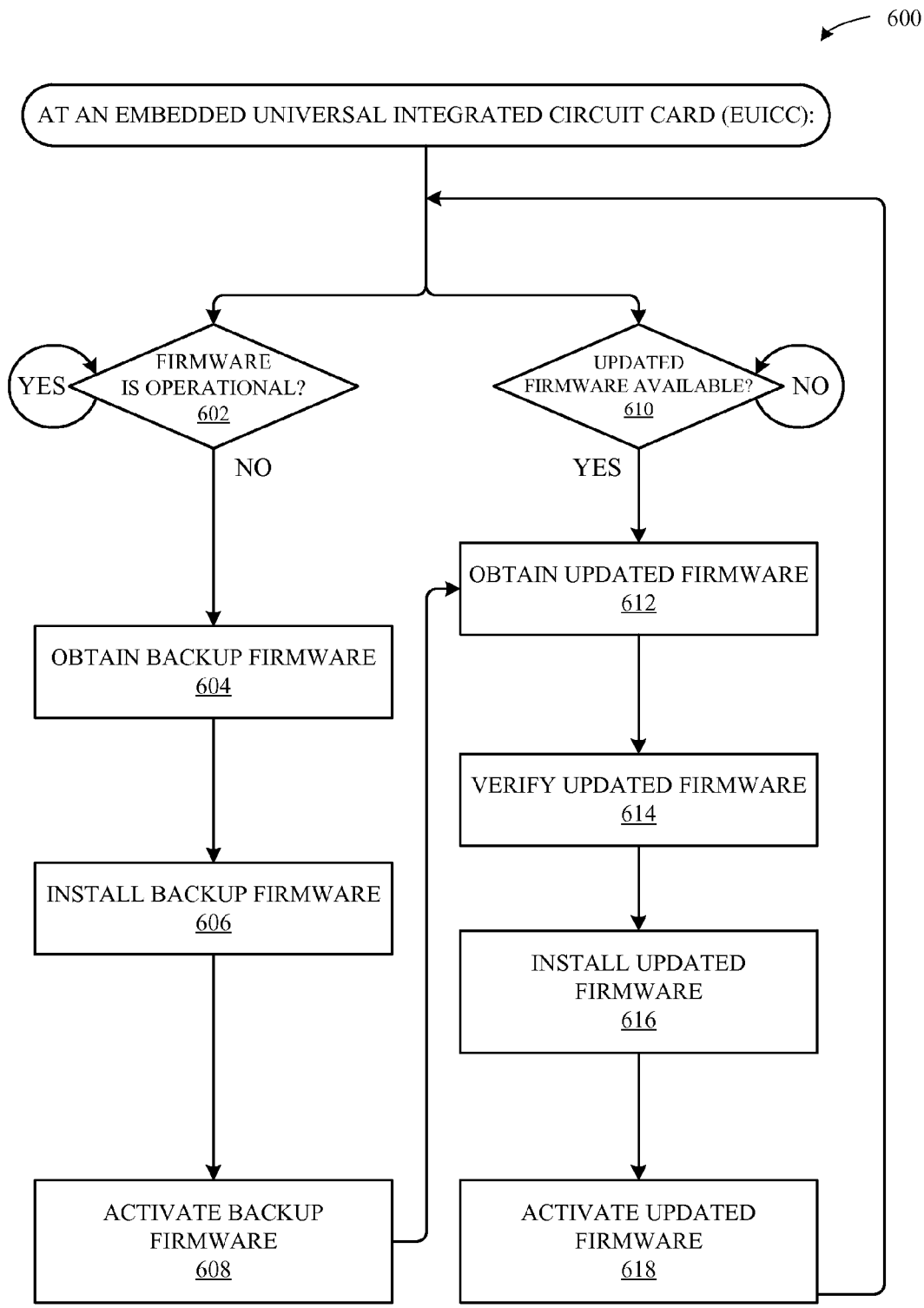
FIG. 6 illustrates a method for a high-level technique that implements the various techniques described above in conjunction with FIGS. 3-5, to promote up-to-date and operable firmware remaining intact within the eUICC, according to one embodiment

FIG. 6 illustrates a method 600 for a high-level technique that implements the various techniques described above in conjunction with FIGS. 3-5, to promote up-to-date and operable firmware remaining intact within the eUICC 108, according to one embodiment. As shown, the method 600 begins at step 602, where the eUICC 108 determines whether the primary eUICC firmware 212 is operational. If, at step 602, the eUICC 108 determines that the primary eUICC firmware 212 is operational, then the method repeats at step 602 until a different condition occurs. When, at step 602, the eUICC 108 determines that the primary eUICC firmware 212 is not operational, then the method 600 proceeds to step 604.

At step 604, the eUICC 108—specifically, the firmware loader 210—obtains the backup eUICC firmware 214 in accordance with the techniques described above in conjunction with FIG. 4. At step 606, the firmware loader 210 installs the backup eUICC firmware 214 in accordance with the techniques described above in conjunction with FIG. 4. At step 608, the firmware loader 210 activates the backup eUICC firmware 214 in accordance with the techniques described above in conjunction with FIG. 4, whereupon method steps 612-618 can be carried out by the firmware loader 210 in an attempt to restore operable primary eUICC firmware 212 within the eUICC 108.

Referring back now to step 610, if the firmware loader 210 determines that updated primary eUICC firmware 212 is available, then the method 600 proceeds to step 612, where the firmware loader 210 obtains the updated primary eUICC firmware 212 in accordance with the techniques described above in conjunction with FIG. 3. At step 614, the firmware loader 210 verifies the updated primary eUICC firmware 212 in accordance with the techniques described above in conjunction with FIG. 3. At step 616, the firmware loader 210 installs the updated primary eUICC firmware 212 in accordance with the techniques described above in conjunction with FIG. 3. Finally, at step 618, the firmware loader 210 activates the updated primary eUICC firmware 212 in accordance with the techniques described above in conjunction with FIG. 3.

Figure 7:
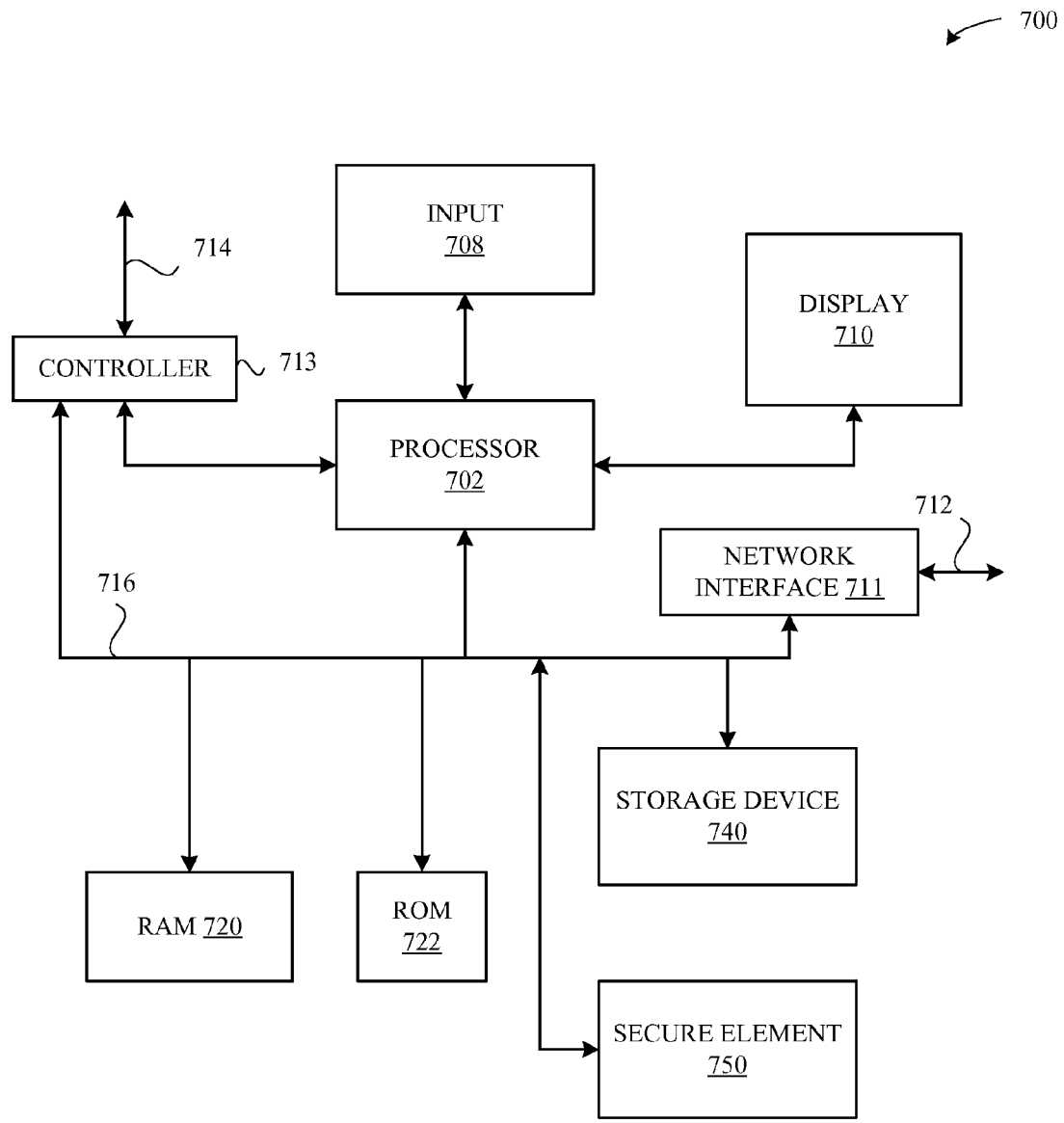
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the mobile device 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element 750, which can represent the eUICC 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for updating firmware of an embedded Universal Integrated Circuit Card (eUICC) included in a mobile device, the method comprising:

at the eUICC:
receiving, from a firmware provider, an indication that an updated firmware is available for the eUICC;
in response to the indication, providing, to the firmware provider, (i) a unique identifier (ID) associated with the eUICC, and (ii) a nonce value;
subsequent to providing, receiving, from the firmware provider, a firmware update package, wherein the firmware update package includes (i) authentication information, and (ii) the updated firmware;
subsequent to verifying the authentication information, persisting, to a memory included in the mobile device, a hash value that corresponds to the updated firmware; and
installing the updated firmware on the eUICC.

2. The method of claim 1, further comprising:
subsequent to installing the updated firmware, attempting to verify the updated firmware using the hash value persisted to the memory.

3. The method of claim 2, further comprising, when the updated firmware is verified:
activating the updated firmware.

4. The method of claim 2, further comprising, when the updated firmware is not verified:
obtaining a backup firmware from the memory; and
installing the backup firmware on the eUICC.

5. The method of claim 4, further comprising:
subsequent to installing the backup firmware, attempting to verify the backup firmware using an existing hash value that is pre-stored in the memory and is based on the backup firmware.

6. The method of claim 5, further comprising, when the backup firmware is verified:
activating the backup firmware, wherein the backup firmware enables a subsequent retrieval and installation of a different updated firmware.

7. The method of claim 1, wherein the memory is a non-volatile memory, and the non-volatile memory is local to the eUICC.

8. The method of claim 1, wherein the authentication information includes a digital signature that is produced by the firmware provider and is based on one or more of the unique ID and the nonce value.

9. The method of claim 8, wherein the firmware provider produces the digital signature in accordance with a public key/private key pair, the public key is pre-stored in the memory of the eUICC, and the eUICC verifies the digital signature using the public key.

10. An embedded Universal Integrated Circuit Card (eUICC) configured to perform a firmware recovery procedure, the eUICC comprising:
  a non-volatile memory; and
  a processor, configured to carry out steps that include:
    detecting a failure of a primary firmware of the eUICC;
    obtaining, from the non-volatile memory, a backup firmware for the eUICC, wherein the backup firmware is stored within a protected area of the non-volatile memory; and
    replacing the primary firmware with the backup firmware, wherein the backup firmware enables a subsequent installation of a different primary firmware.

11. The eUICC of claim 10, wherein the steps further include, subsequent to replacing the primary firmware with the backup firmware:
  verifying the backup firmware by comparing the backup firmware against a hash value that is previously stored in the non-volatile memory and is based on the backup firmware.

12. The eUICC of claim 10, further comprising activating the backup firmware to carry out the subsequent installation of the different primary firmware.

13. The eUICC of claim 10, further comprising, subsequent to detecting the failure of the primary firmware:
  entering into a restore mode that enables a replacement of the backup firmware with the primary firmware.

14. A mobile device including an eUICC that is configured to carry out a firmware update, the mobile device comprising:
  the eUICC, wherein the eUICC is configured to carry out steps that include:
    receiving, from a firmware provider, an indication that an updated backup firmware is available for the eUICC;
    in response to the indication, providing, to the firmware provider, (i) a unique identifier (ID) associated with the eUICC, and (ii) a nonce value;
    receiving, from the firmware provider, a firmware update package, wherein the firmware update package includes (i) authentication information, and (ii) the updated backup firmware; and
    subsequent to verifying the authentication information:
      persisting, to a memory included in the mobile device, (i) the updated backup firmware, and (ii) a hash value based on the updated backup firmware.

15. The mobile device of claim 14, wherein, subsequent to persisting the hash value to the memory, the eUICC continues operating a primary firmware that is different from the updated backup firmware.

16. The mobile device of claim 15, further comprising, subsequent to persisting the hash value to the memory, and upon detecting that the primary firmware is inoperable:
  installing the backup firmware on the eUICC; and
  subsequent to installing the backup firmware, attempting to verify the backup firmware based on the hash value.

17. The mobile device of claim 16, further comprising, when the backup firmware is verified:
  activating the backup firmware, wherein the backup firmware enables a subsequent retrieval and installation of a different primary firmware.

18. The mobile device of claim 14, wherein the memory is a non-volatile memory, and the non-volatile memory is local to the eUICC.

19. The mobile device of claim 14, wherein the authentication information includes a digital signature that is produced by the firmware provider and is based on one or more of the unique ID and the nonce value.

20. The mobile device of claim 19, wherein the firmware provider produces the digital signature in accordance with a public key/private key pair, and the eUICC stores the public key in the memory and verifies the digital signature using the public key.

* * * * *